US009914603B2

(12) United States Patent
Heim et al.

(10) Patent No.: US 9,914,603 B2
(45) Date of Patent: Mar. 13, 2018

(54) WEATHER BARRIERS FOR VEHICLE LOADING DOCKS

(71) Applicants: Frank Heim, Platteville, WI (US); Ryan Withrow, Platteville, WI (US)

(72) Inventors: Frank Heim, Platteville, WI (US); Ryan Withrow, Platteville, WI (US)

(73) Assignee: RITE-HITE HOLDING CORPORATION, Milwaukee, WI (US)

(*) Notice: Subject to any disclaimer, the term of this patent is extended or adjusted under 35 U.S.C. 154(b) by 0 days.

(21) Appl. No.: 15/086,909

(22) Filed: Mar. 31, 2016

(65) Prior Publication Data
US 2017/0283193 A1 Oct. 5, 2017

(51) Int. Cl.
B65G 69/00 (2006.01)
(52) U.S. Cl.
CPC .................. B65G 69/008 (2013.01)
(58) Field of Classification Search
CPC .................................................. B65G 69/008
USPC .......................... 52/2.11, 2.12, 173.1, 173.2
See application file for complete search history.

(56) References Cited

U.S. PATENT DOCUMENTS

| 3,403,489 A | 10/1968 | Frommelt et al. |
| 3,538,655 A | 11/1970 | Frommelt et al. |
| 3,557,508 A | 1/1971 | Frommelt et al. |
| 3,653,173 A | 4/1972 | Frommelt et al. |
| 3,699,733 A | 10/1972 | Frommelt et al. |
| RE28,391 E | 4/1975 | Frommelt et al. |
| 4,213,279 A * | 7/1980 | Layne .................. B65G 69/008 52/173.2 |
| 4,638,612 A | 1/1987 | Bennett |

(Continued)

FOREIGN PATENT DOCUMENTS

| DE | 2927233 | 1/1981 |
| EP | 1457443 | 9/2004 |

(Continued)

OTHER PUBLICATIONS

Frommelt Products Corporation, "Four Ways to Cut Your Costs and Boost Your Profits," 2002, Brochure, 6 pages.

(Continued)

Primary Examiner — Adriana Figueroa
(74) Attorney, Agent, or Firm — Hanley, Flight & Zimmerman, LLC

(57) ABSTRACT

Weather barriers for vehicle loading docks are disclosed. An example weather barrier includes a side support member being vertically elongate between an upper end and a lower end of the side support member. The side support member has a back end to be attached to a wall proximate a lateral doorway edge. The side support member is to extend in a forward direction to a front end of the side support member. A vertically elongate front sheet includes a pliable sheet having a proximal end and a distal end, where the proximal end is to attach to the front end of the side support member. The front sheet extends in a lateral direction from the proximal end to the distal end, where the lateral direction is horizontal and perpendicular to the forward direction. The front sheet is to extends in front of the doorway. A stay is to be coupled to the front sheet. The stay is resiliently flexible and horizontally elongate. The stay is to subject the front sheet to tension in a horizontal direction.

31 Claims, 13 Drawing Sheets

(56) References Cited

U.S. PATENT DOCUMENTS

| | | | |
|---|---|---|---|
| 4,805,362 A | 2/1989 | Frommelt et al. | |
| 5,185,977 A | 2/1993 | Brockman et al. | |
| 5,341,613 A | 8/1994 | Brockman et al. | |
| 5,394,662 A | 3/1995 | Giuliani et al. | |
| 5,553,424 A * | 9/1996 | Brockman | B65G 69/008 49/504 |
| 5,622,016 A | 4/1997 | Frommelt et al. | |
| 5,953,868 A | 9/1999 | Giuliani et al. | |
| 6,205,721 B1 | 3/2001 | Ashelin et al. | |
| 6,233,885 B1 | 5/2001 | Ridenour et al. | |
| 6,311,435 B1 | 11/2001 | Brockman et al. | |
| 6,374,554 B1 | 4/2002 | Eungard | |
| 6,431,252 B1 | 8/2002 | Eungard et al. | |
| 7,185,463 B2 | 3/2007 | Borgerding | |
| 7,757,442 B2 * | 7/2010 | Hoffmann | B65G 69/008 52/173.2 |
| 7,882,663 B2 | 2/2011 | Borgerding | |
| 8,112,948 B2 * | 2/2012 | Desjardins | B65G 69/008 52/173.2 |
| 8,307,588 B2 | 11/2012 | Hoffmann et al. | |
| 8,327,587 B2 | 12/2012 | Digmann et al. | |
| 8,887,447 B2 | 11/2014 | Hoffmann et al. | |
| 8,915,029 B2 * | 12/2014 | Digmann | B65G 69/008 52/173.2 |
| 9,003,724 B2 | 4/2015 | Digmann et al. | |
| 9,003,725 B2 | 4/2015 | Digmann et al. | |
| 9,010,039 B2 | 4/2015 | Digmann et al. | |
| 9,079,713 B2 | 7/2015 | Digmann et al. | |
| 9,162,832 B2 | 10/2015 | Digmann et al. | |
| 9,187,271 B2 | 11/2015 | Digmann et al. | |
| 9,193,543 B2 | 11/2015 | Digmann | |
| 9,273,512 B2 | 3/2016 | Digmann et al. | |
| 2002/0110423 A1 * | 8/2002 | Miller | B65G 69/008 405/110 |
| 2004/0000105 A1 | 1/2004 | Brockman et al. | |
| 2004/0020141 A1 * | 2/2004 | Borgerding | B65G 69/008 52/173.2 |
| 2004/0134139 A1 * | 7/2004 | Busch | B65G 69/008 52/173.2 |
| 2004/0163326 A1 * | 8/2004 | Miller | B65G 69/008 52/2.12 |
| 2004/0261335 A1 * | 12/2004 | Eungard | B65G 69/008 52/173.2 |
| 2006/0026912 A1 | 2/2006 | Eungard et al. | |
| 2006/0032159 A1 * | 2/2006 | Eungard | B65G 69/008 52/173.2 |
| 2015/0007511 A1 | 1/2015 | Digmann et al. | |
| 2015/0007513 A1 | 1/2015 | Digmann et al. | |
| 2015/0376892 A1 | 12/2015 | Digmann et al. | |

FOREIGN PATENT DOCUMENTS

| | | |
|---|---|---|
| WO | 02064908 | 8/2002 |
| WO | 2013126327 | 8/2013 |

OTHER PUBLICATIONS

International Searching Authority, "International Search Report," issued in connection with International Patent Application No. PCT/US2017/022519, dated Jun. 21, 2017, 7 pages.

International Searching Authority, "Written Opinion," issued in connection with International Patent Application No. PCT/US2017/022519, dated Jun. 21, 2017, 13 pages.

\* cited by examiner

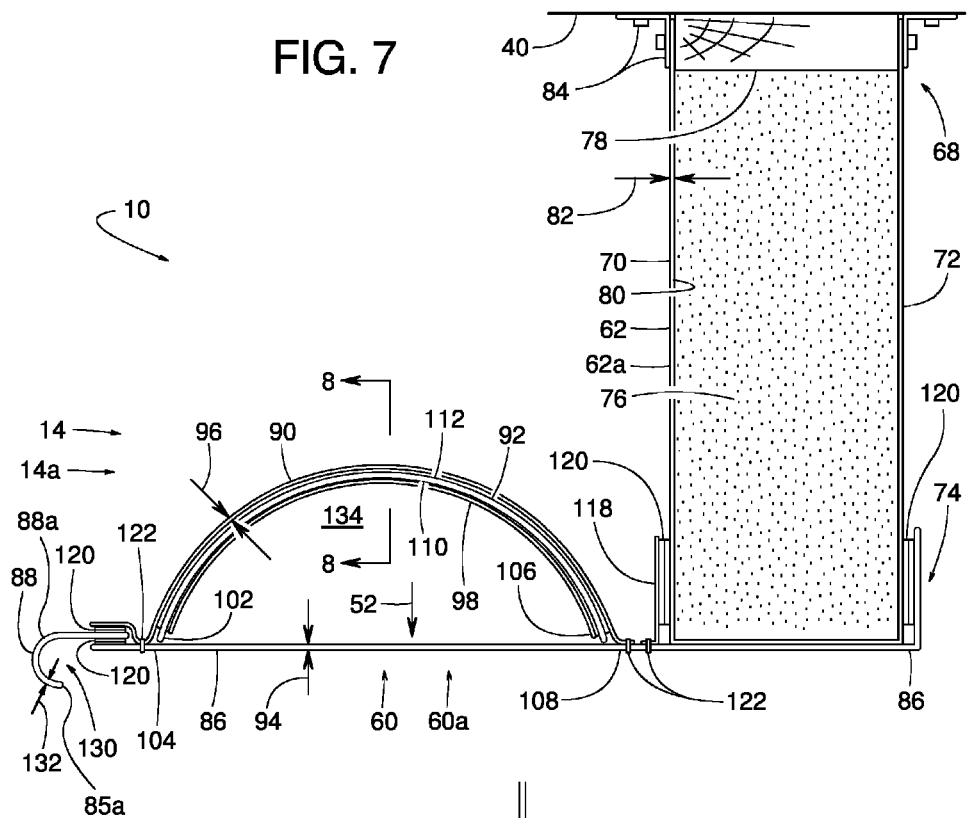
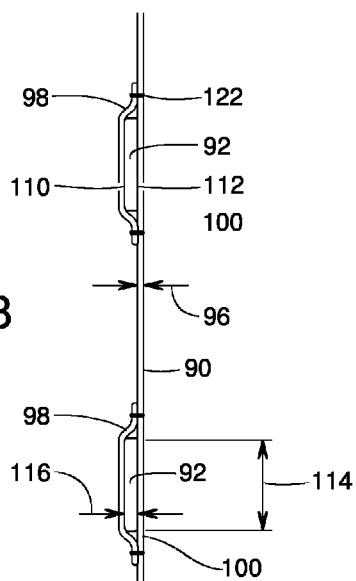

WEATHER BARRIERS FOR VEHICLE LOADING DOCKS

FIELD OF THE DISCLOSURE

The present disclosure relates generally to weather barriers and, more specifically, to weather barriers for vehicle loading docks.

BACKGROUND

Dock weather barriers (weather barrier apparatus), such as dock seals and dock shelters, restrict or prevent the ingress of outdoor environmental conditions or contaminants (e.g., rain, snow, wind, hot/cold temperatures, insects, animals, etc.) into the interior of a building and cargo area of a vehicle during the loading or unloading of the vehicle. Dock shelters and seals can also prevent the egress of conditioned air from within a building and/or a vehicle cargo area to the outdoor environment. Examples of dock seals and/or shelters with various header structures and side structures are disclosed in U.S. Pat. Nos. 6,205,721; 6,233,885; 7,185,463; 8,307,588 and 8,887,447; all of which are specifically incorporated by reference herein in their entireties.

Some known dock seals use side members having a compressible foam core or body surrounded by a coated fabric or vinyl outer layer. The foam core provides sufficient structural rigidity to enable the side members to be extended a short distance from the building wall surrounding the loading dock. The coated fabric outer layer protects the foam core from outdoor environmental conditions (e.g., moisture), provides wear resistance to repeated impacts from the rear portions of vehicles, and may provide desirable aesthetic qualities. Additionally, a header structure may span between and/or above the side members and is installed along a top portion of the loading dock opening. The header structure may be a compressible member similar in construction to the side members and, in some cases, may include a weighted fabric curtain that hangs downwardly to contact the top of a truck trailer to form an environmental barrier along the top of the trailer.

Another type of dock seal uses inflatable side members and a header structure having internal compressible resilient pads, which provide some degree of side member compressibility when the side members are in a deflated condition. In either case, when the rear portion of a vehicle (e.g., a truck trailer) is backed into either a foam or an inflatable dock seal side and header members, the side and header members compress toward the building wall to form a seal along the lateral and top back edges of the vehicle. If present, the head curtain sweeps along a top of a trailer to form a seal at the top of the trailer between the side members. Dock seals typically consume a relatively small amount of wall space and can provide a relatively high quality seal between the rear edges of a vehicle and the outside building wall surrounding the dock. However, when the dock seal side members are compressed, they may be displaced into or otherwise encroach on the opening to the rear of the docked vehicle. As a result, the compressed side member may interfere with operation of a fork lift and/or an operator during loading and unloading activities. In addition, inflatable dock seals are susceptible to power losses and tears that compromise the ability of the side members to inflate to provide an acceptable seal.

In contrast to dock seals, some known dock shelters use side members that are mounted to the outside building wall surrounding the loading dock. The side members are spaced well to the outside of the sides of a docked vehicle. The side members are configured to extend (i.e., to be cantilevered) an appreciable distance from the outside building wall, particularly in cases where a dock leveler protrudes from the dock opening. The side members may also support flexible seal members or side curtains extending inwardly from the side members across at least a portion of the opening defined by the side members. When a vehicle such as, for example, a truck trailer, is backed into the opening of the dock shelter, the inwardly facing edges of the seal members or side curtains resiliently deflect and sweep against the lateral sides of the trailer to form an environmental barrier therebetween. As with dock seals, dock shelters also typically include a header structure, which may include a head curtain, to form an environmental barrier along the top edge of the rear of the vehicle.

In contrast to dock seals, dock shelters typically provide unobstructed access to a vehicle cargo area opening (i.e., there are no foam pads or the like to be compressed and displaced into the opening). However, most known dock shelter side members are constructed using rigid wood, fiberglass or metal frames capable of supporting the significant weight of the seal members or side curtains, which are usually held at an appreciable distance (e.g., several feet) from the building wall. Such side members may be permanently deformed if they are impacted by a vehicle. Accordingly, bumpers or stops may be mounted to the lower edge of the dock shelter to prevent a vehicle (e.g., a truck trailer) from impacting and damaging the rigid shelter.

More recently, dock shelters having impactable side members have been developed. The impactable side members are similar to those used with dock seals and typically use a foam core or body surrounded by a coated fabric outer layer. Seal members or side curtains, which may be constructed using a fabric and flexible fiberglass stays combination or a foam core and fabric combination, are typically mounted to the side members to extend at least partially across the shelter opening. When a vehicle is backed into the shelter, the inwardly facing edges of the seal members or side curtains deflect and sweep against the sides of the vehicle to form an environmental barrier or seal against the sides of the vehicle. In the event the off-center position of a vehicle results in the rear of the vehicle impacting a side member, the foam core or body of the side member is resiliently compressed. When the vehicle is pulled away from an impacted side member, the foam core of the side member causes the side member to substantially recover to its original condition or shape.

BRIEF DESCRIPTION OF THE DRAWINGS

FIG. 7 is a cross-sectional view taken along line 7-7 of FIG. 1.

FIG. 8 is a cross-sectional view taken along line 8-8 of FIG. 7.

Figure 1:
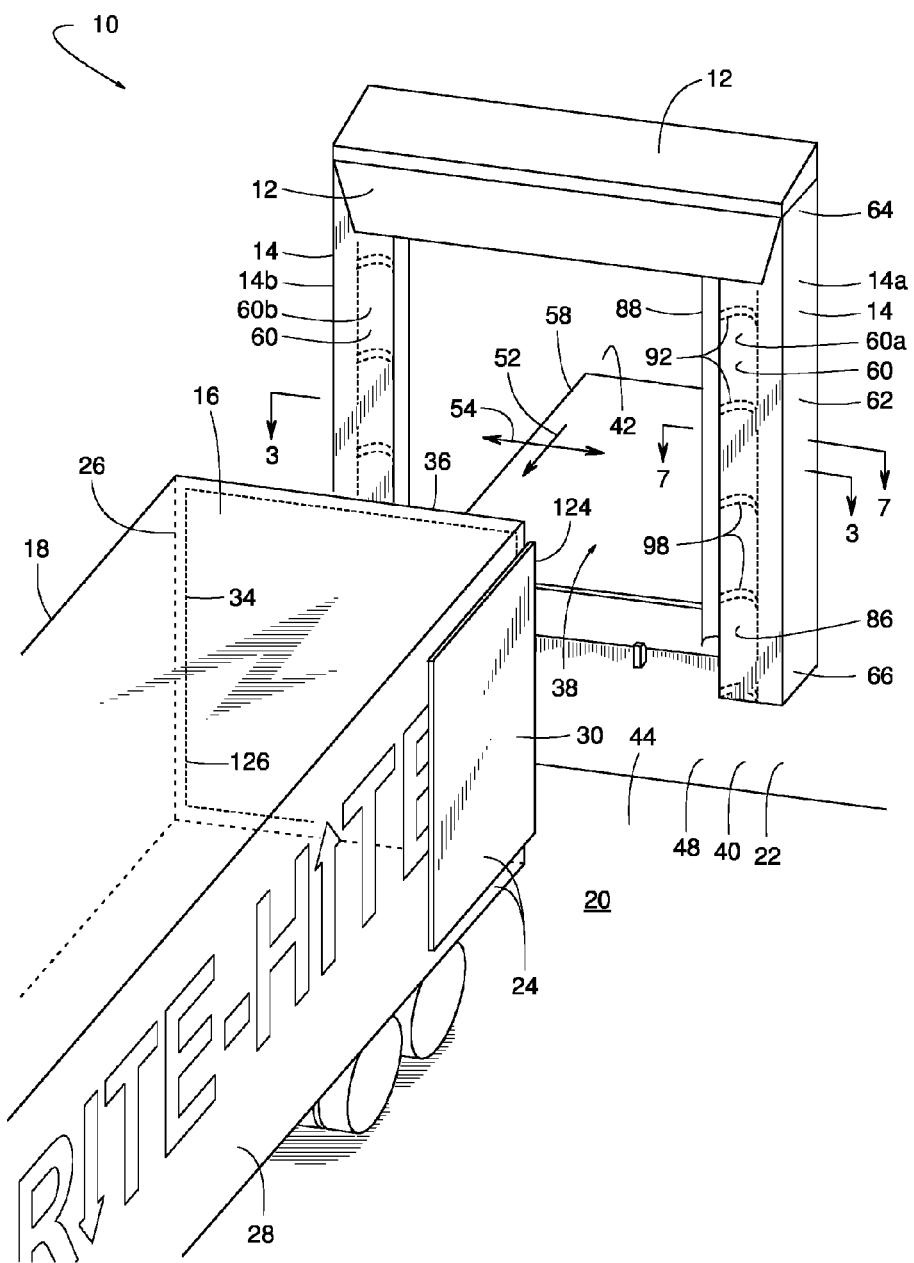
FIG. 1 is an isometric view of an example vehicle backing toward an example weather barrier constructed in accordance with the teachings disclosed herein.

Wherever possible, the same reference numbers will be used throughout the drawing(s) and accompanying written description to refer to the same or like parts. As used in this description, stating that any part (e.g., a layer, a sheet) is in any way positioned on (e.g., positioned on, located on, disposed on, or formed on, engaged with, etc.) another part, means that the referenced part is either in contact with the other part, or that the referenced part is adjacent (e.g., above or below) the other part with one or more intermediate part(s) located there between. Stating that any part is in direct contact with another part means that there is no intermediate part between the two parts.

DETAILED DESCRIPTION

Example weather barriers for sealing or sheltering a vehicle parked at a loading dock are disclosed. An example weather barrier disclosed herein includes a series of resiliently flexible bowed stays. The stays impart or exert a spring force (e.g., a tension force) that holds or positions a pliable front sheet in a taut condition. The bowed stays and front sheet assembly provide a forward facing lateral seal to seal against rear vertical edges and sides of the vehicle. In some examples, the example weather barriers disclosed herein may have a relatively rigid lip along a vertical edge of the front sheet that is to hook onto or engage the vehicle's rear vertical edge. In this manner, as the vehicle backs into or engages the weather barrier, the hooked lip pulls the front sheet snugly against the vehicle's rear vertical edge. In examples where the vehicle includes a hinged rear door panel that is swung open against the vehicle's side panel, the front sheet is also pulled across a hinge gap between the swung-open door panel and the vehicle's side panel.

FIGS. 1-15 show example weather barriers 10 and 10' with an example header structure 12 and various example side structure assemblies 14 (e.g., a first side structure assembly 14a and a second side structure 14b, which are substantially identical). Header structure 12 is schematically illustrated to represent any suitable means for sealing against a roof 16 of a vehicle 18 (e.g., truck, trailer, etc.) parked at a loading dock 20 of a building 22. Examples of the header structure 12 include, but are not limited to, the header structures disclosed in U.S. Pat. Nos. 9,193,543; 9,162,832; 9,079,713; 9,010,039; 9,003,725; 8,327,587; and 7,882,663; all of which are specifically incorporated by reference herein in their entireties.

The side structure assemblies 14 are for sealing against a rear side 24 and/or a rear vertical edge 26 of the vehicle 18. Examples of the rear side 24 include, but are not limited to, a side panel 28 of the vehicle 18 and/or a swung-open door panel 30, where a hinge 32 (FIG. 3) pivotally couples the door panel 30 to the side panel 28 so that the door panel 30 can be used to open and close a rear cargo opening 34 of the vehicle 18. FIGS. 1-6 show the door panel 30 in a swung-open position. A pair of side structure assemblies 14 in combination with the header structure 12 shelter a rear portion 36 of the vehicle 18 as cargo is exchanged between the vehicle 18 and the building 22. During the cargo exchange process, the loading dock 20 facilitates the transfer of cargo through the rear cargo opening 34 and a doorway 38 through a wall 40 of the building 22.

In some examples, the loading dock 20 includes an interior platform 42 by the doorway 38 and an exterior driveway 44 leading to the doorway 38. The doorway 38 has an upper edge and two vertically elongate lateral doorway edges (a first or right doorway edge 46a and a second or left doorway edge 46b). As for the location of the lateral edges 46a and 46b of the doorway 38, the terms, "left" and "right" can be reversed. An exterior or forward-facing surface 48 of the wall 40 lies along and, thus, defines a plane 50. The term, "plane" is a spatial geometric term and is not necessarily an actual physical structure. The term, "forward-facing" is with reference to a forward direction 52, which is perpendicular to the plane 50 and points toward the vehicle 18 when the vehicle 18 is parked proximate the doorway 38, as shown for example in FIGS. 2 and 4. A lateral direction 54 is horizontal and perpendicular to the forward direction 52.

Interior platform 42 is at preferably about the same elevation as a cargo bed 56 of the vehicle 18 to facilitate transferring cargo between the building 22 and the vehicle 18. To further facilitate the transfer of cargo, some examples of the dock 20 include a dock leveler 58, a vehicle restraint, bumpers and other known dock-related equipment. Dock leveler 58 is extendable to provide a bridge spanning a horizontal gap and a moderate elevation difference (e.g., a vertical distance) between platform 42 and the vehicle's cargo bed 56 so that personnel and material handling equipment can readily travel between the platform 42 and the bed 56. A vehicle restraint helps prevent the vehicle 18 from prematurely departing the dock 20, and bumpers help avoid damaging impact between the vehicle 18 and the building 22. Bumpers further help establish a properly parked distance between the vehicle 18 and a front edge of the platform 42, the dock leveler 58 and/or the wall 40.

FIGS. 1-6 and 9-12 show various configurations of the weather barrier 10 and positions of the vehicle 18. The vehicle 18 can be positioned selectively to a non-parked position (FIGS. 1, 3 and 9), parked at a centrally aligned position (FIGS. 2, 4 and 10), parked at a first laterally offset position (FIGS. 5 and 11), parked at a second laterally offset position (FIGS. 6 and 12), etc. In the non-parked position, the vehicle 18 is spaced apart from the weather barrier 10 (e.g., the vehicle 18 is not in engagement with the weather barrier 10). In the centrally aligned position, the vehicle 18 engages the weather barrier 10 while the vehicle 18 is centrally aligned with the doorway 38 with reference to the lateral direction 54 (e.g., a midpoint or longitudinal axis of the vehicle 18 is aligned with a midpoint of the doorway 38 with reference to the lateral direction 54). In a laterally offset position, the vehicle 18 engages the weather barrier 10 but is biased off to one side (e.g., of a midpoint of the doorway 38) with reference to the lateral direction 54.

Figure 2:
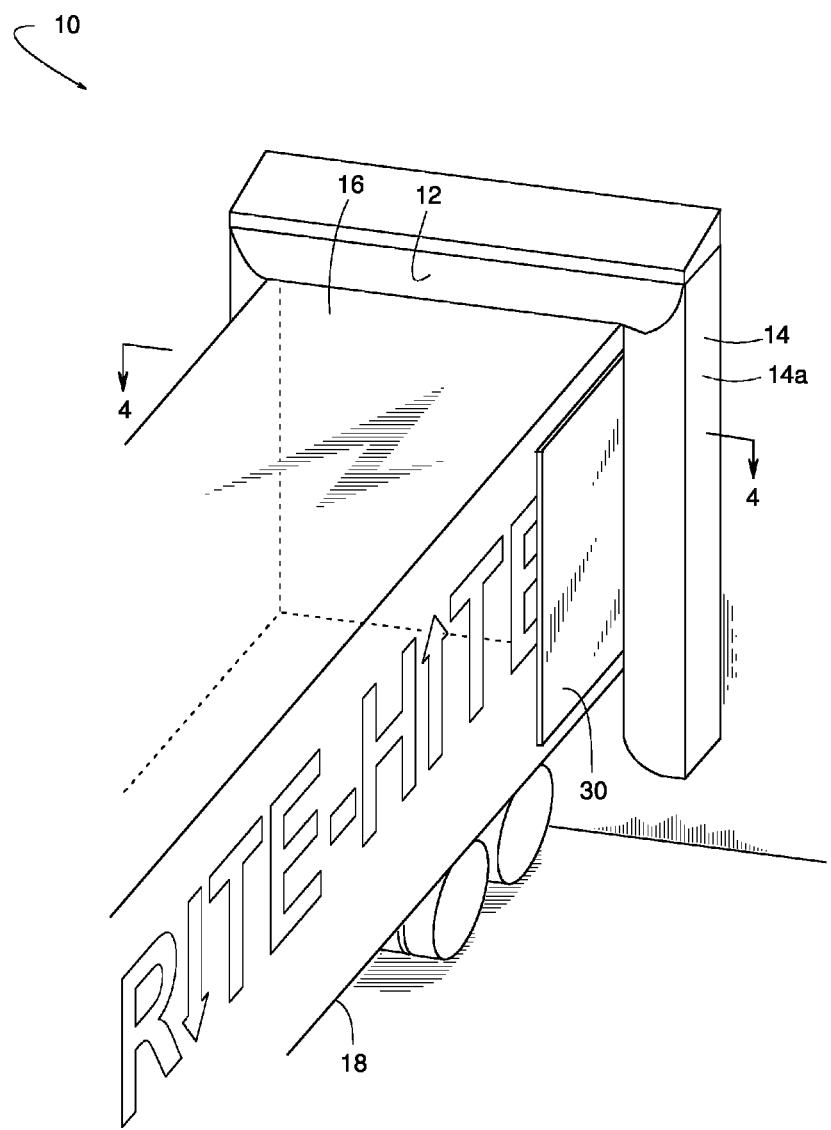
FIG. 2 is an isometric view similar to FIG. 1 but showing the vehicle engaging the weather barrier.
Figure 3:
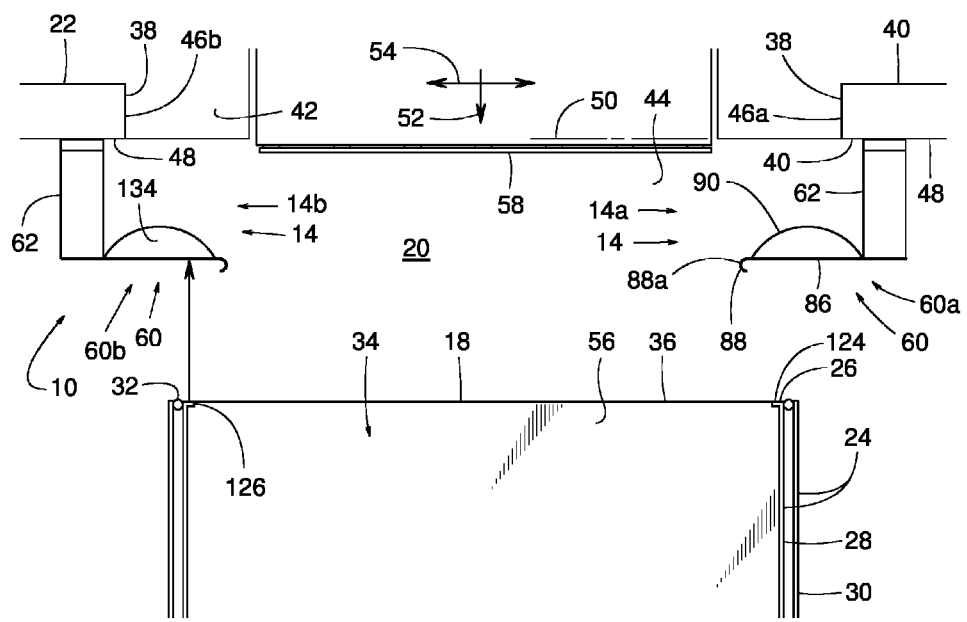
FIG. 3 is a cross-sectional view taken along line 3-3 of FIG. 1.

In the example shown in FIGS. 1-12, the side structure assembly 14 includes a lateral seal 60 (e.g., lateral seals 60a and 60b) attached to a side support member 62. The side support member 62 is vertically elongate between an upper end 64 and a lower end 66 (FIG. 1). Referring to FIG. 3, a back end 68 of the side support member 62 is attached to the wall 40, an inner face 70 of the side support member 62 faces the inner face of the opposite side support member 62, and an outer face 72 of the side support member 62 faces away from the inner face 70. The side support member 62 extends in forward direction 52 to a front end 74 of the side support member 62.

In the illustrated example, the side support member 62 includes a resiliently compressible foam core 76, a backer 78 and a pliable covering 80. The term, "pliable" refers to a sheet of material that can be folded over onto itself and later unfolded without appreciable permanent damage to the material (e.g., elastically deformable). In some examples, the covering 80 is a vinyl based material sometimes referred to as 22-ounce vinyl, wherein "22-ounce" refers to a sheet of material having a covering material thickness 82 that provides the covering 80 with a weight of about 22 ounces per square-yard. Other examples of the covering 80 can be made of other pliable materials and other material thicknesses. In some examples, the core 76 includes a block of polyurethane foam. Other examples of the side support member 62 may have equivalent alternatives to a resiliently flexible foam core.

In some examples, the flexibility of the covering 80 and the foam core 76 enable the side support member 62 to endure a vehicular impact and to flex to accommodate vehicles of various sizes and parked positions. The covering 82 protects the foam core 76 from abrasion and/or weather elements. The backer 78 (e.g., wooden plank, sheet metal channel, etc.) and other mounting hardware 84 (e.g., screws, anchors, brackets, angle iron, etc.) can be used to mount the side support member 62 to wall 40. Although the foam core 76 is resiliently compressible, the foam core 76 has sufficient stiffness to support the weight of lateral seal 60 in a cantilevered manner from the front end 74 of the side support member 62.

Figure 4:
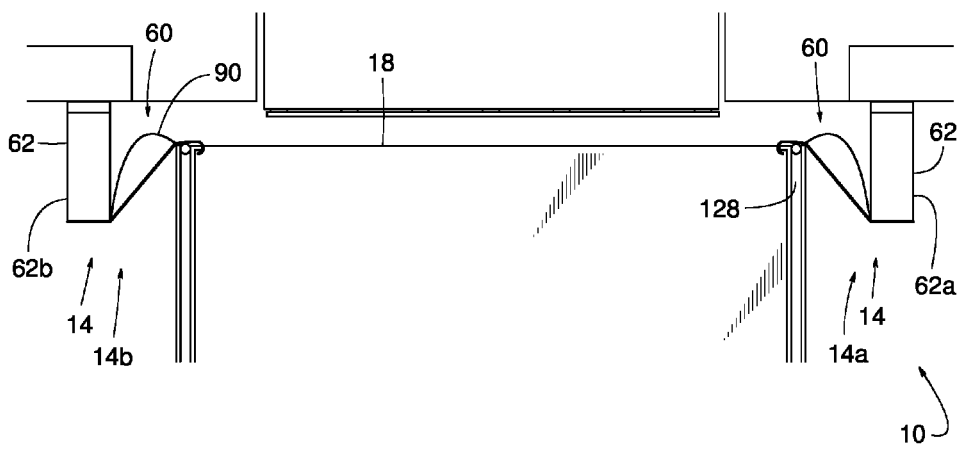
FIG. 4 is a cross-sectional view taken along line 4-4 of FIG. 2 and showing the vehicle at a centrally aligned position relative to the example weather barrier.
Figure 5:
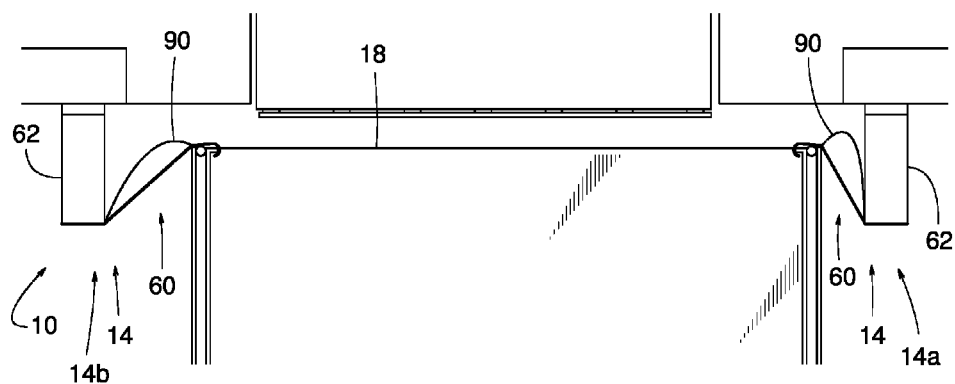
FIG. 5 is a cross-sectional view similar to FIG. 4 but showing the vehicle at a first laterally offset position relative to the example weather barrier.
Figure 6:
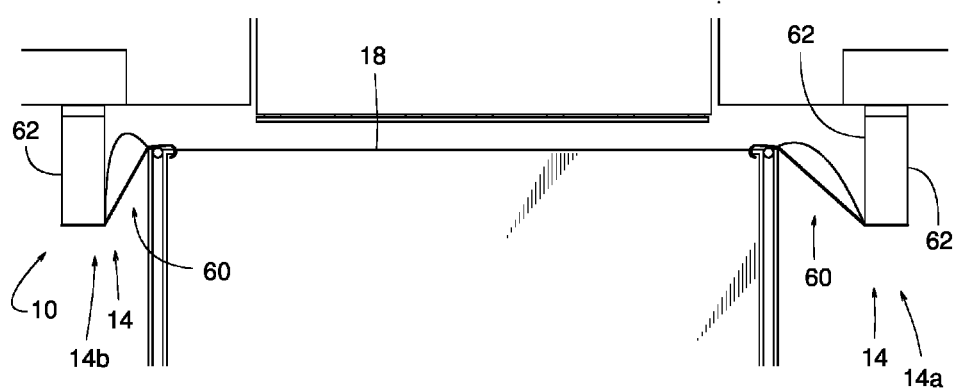
FIG. 6 is a cross-sectional view similar to FIG. 5 but showing the vehicle at a second laterally offset position relative to the example weather barrier.
Figure 10:
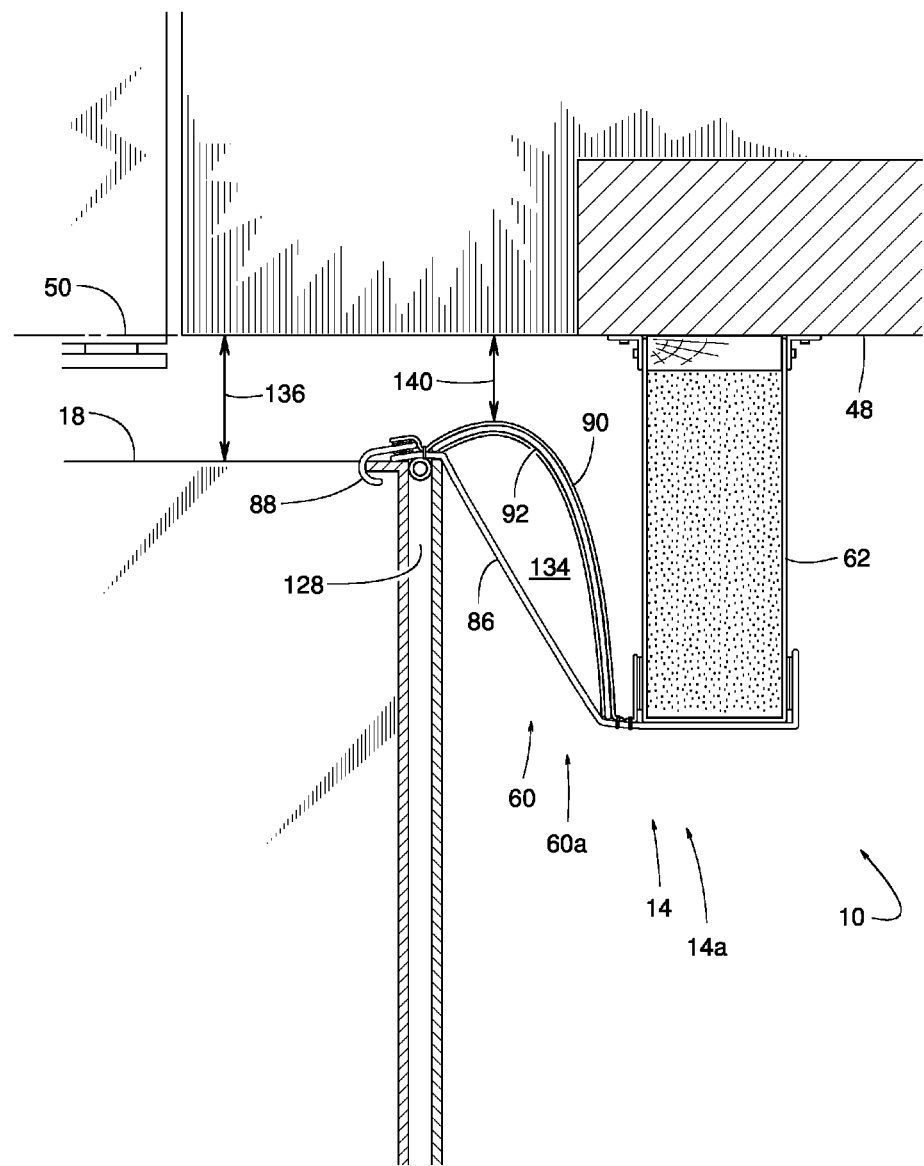
FIG. 10 is a cross-sectional view similar to FIG. 9 but showing the vehicle at the centrally aligned position of FIG. 4.
Figure 11:
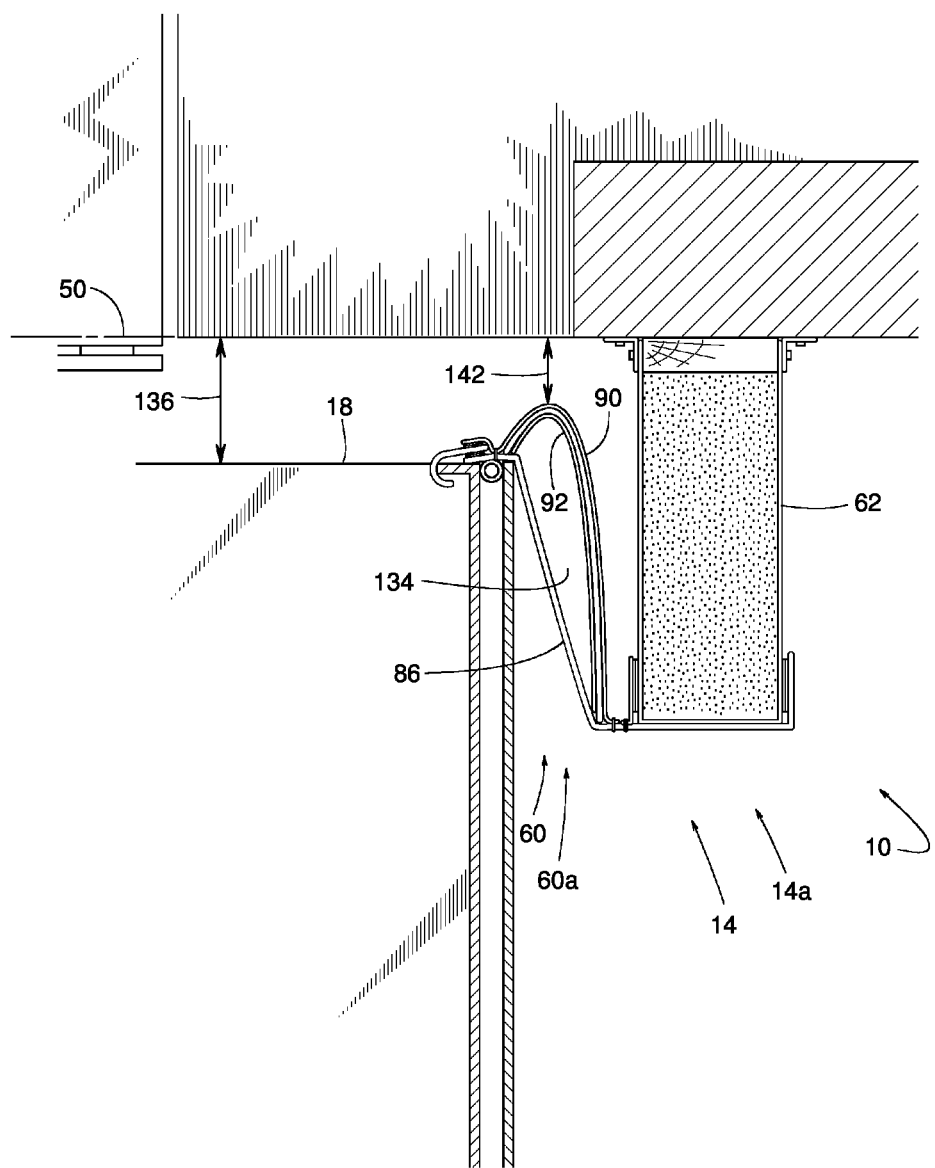
FIG. 11 is a cross-sectional view similar to FIG. 10 but showing the vehicle at the first laterally offset position of FIG. 5.
Figure 12:
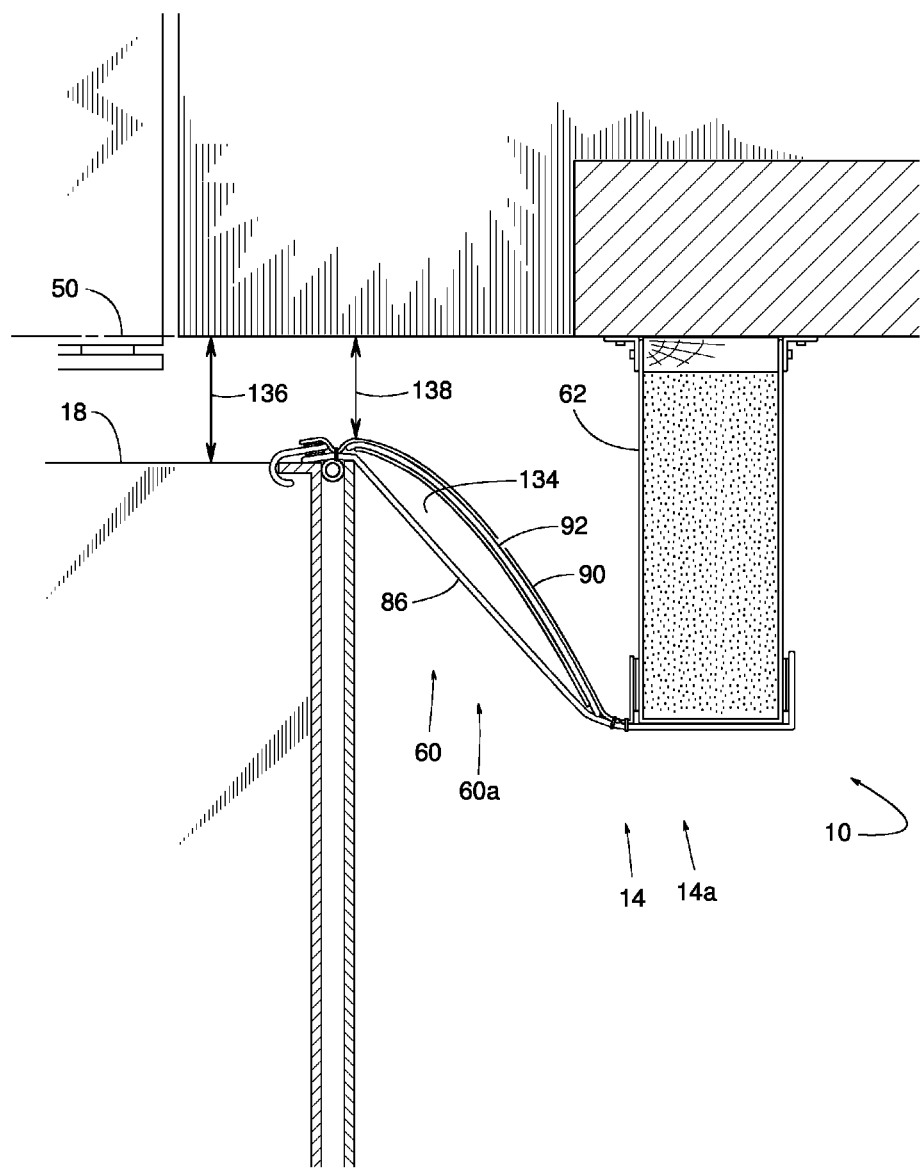
FIG. 12 is a cross-sectional view similar to FIG. 10 showing the vehicle at the second laterally offset position of FIG. 6.

The lateral seal 60 can be configured selectively between a resting configuration (FIGS. 1, 3, 7 and 9) and various deflected configurations (e.g., FIGS. 2, 4-6, and 10-12). In the resting configuration, the lateral seal 60 is spaced apart from, or not in engagement with, the vehicle 18. While in a deflected configuration, the lateral seal 60a is moveable selectively to a centered position (FIGS. 2, 4 and 10), an outward offset position (FIGS. 5 and 11) and/or an inward offset position (FIGS. 6 and 12). Likewise, the lateral seal 60b, while in a deflected configuration, is moveable selectively to a centered position (FIGS. 2 and 4), an outward offset position (FIG. 6) and/or an inward offset position (FIG. 5).

Figure 13:
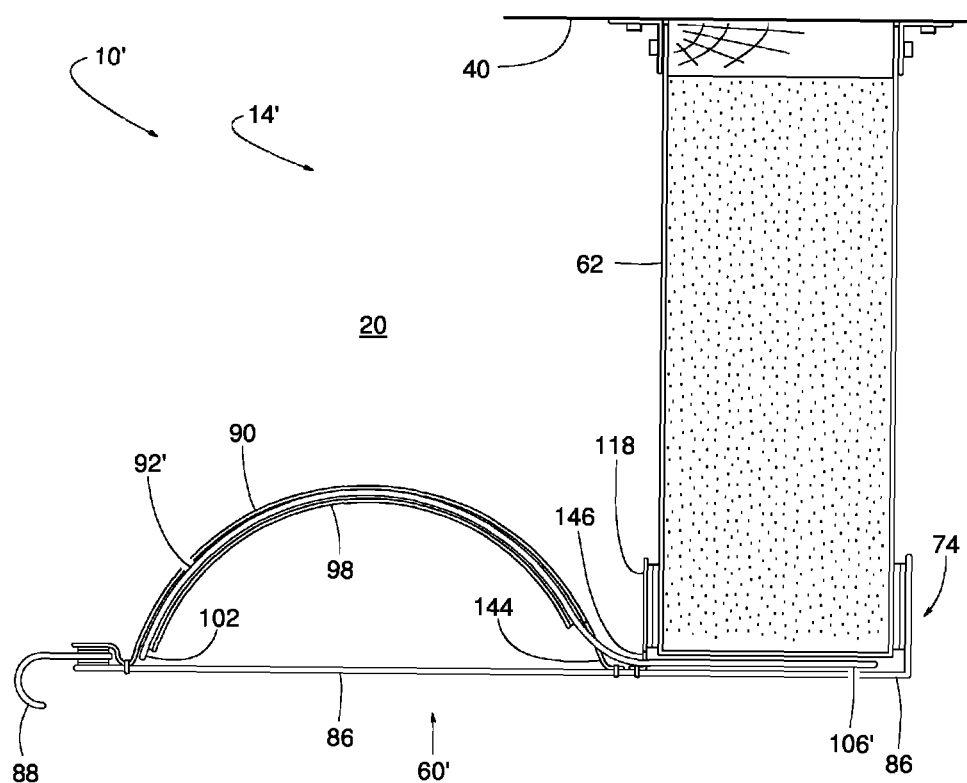
FIG. 13 is a cross-sectional view similar to FIG. 7 but showing another example weather barrier constructed in accordance with the teachings disclosed herein.
Figure 14:
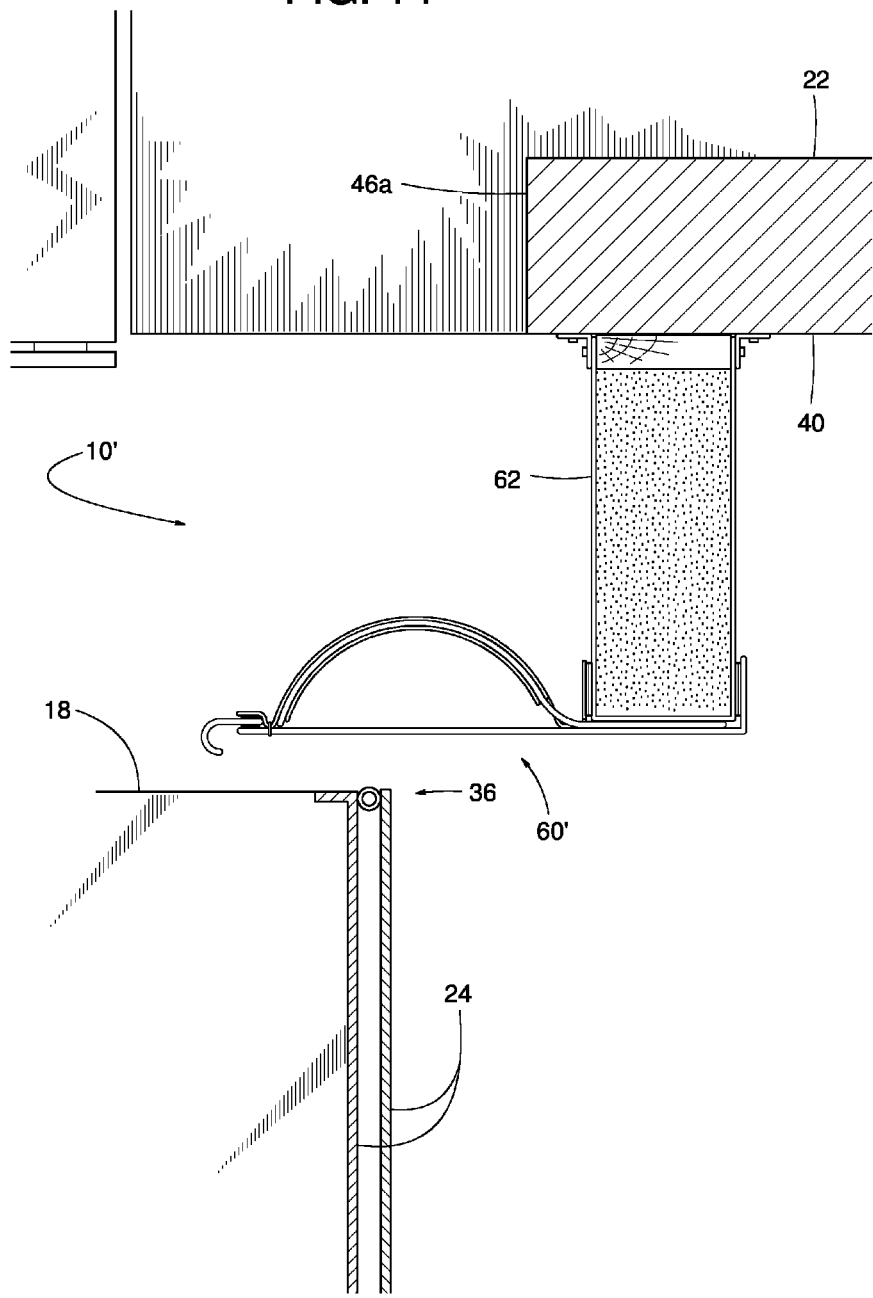
FIG. 14 is a cross-sectional view similar to FIG. 9 but showing the example weather barrier of FIG. 13.
Figure 15:
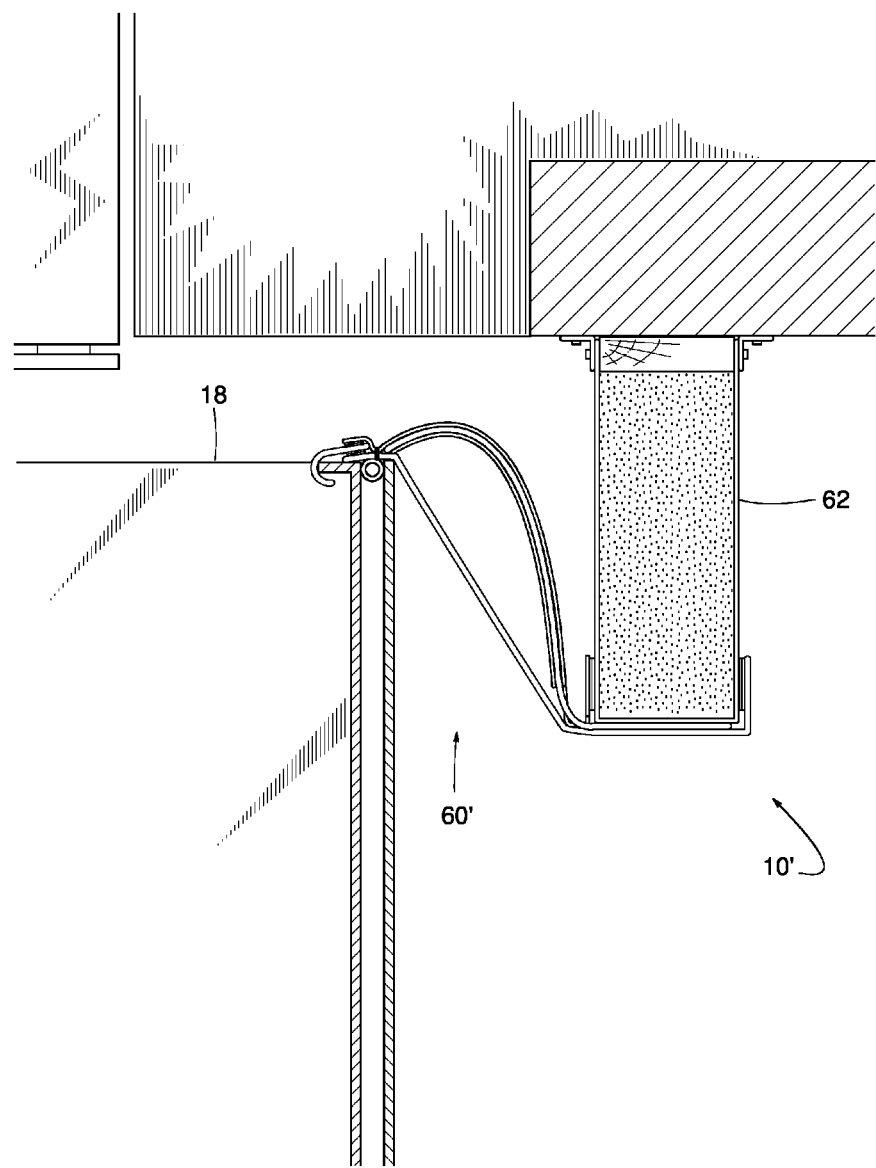
FIG. 15 is a cross-sectional view similar to FIG. 10 but showing the example weather barrier of FIG. 13.

The various configurations and positions of the lateral seal 60 enable the weather barrier 10 to effectively seal against the rear portion 36 of the vehicle 18 even though a vertically elongate hinge gap 128 might exist at the hinge 32 between the door panel 30 of the vehicle 18 and the side panel 28 and even though the vehicle 18 may be laterally misaligned with the doorway 38 (e.g., misaligned relative to a midpoint of the doorway 38 relative to the lateral direction 54). To achieve such effective sealing under such conditions, some examples of the lateral seal 60 are constructed as shown in FIGS. 7-12 or constructed as shown in FIGS. 13-15.

Figure 16:
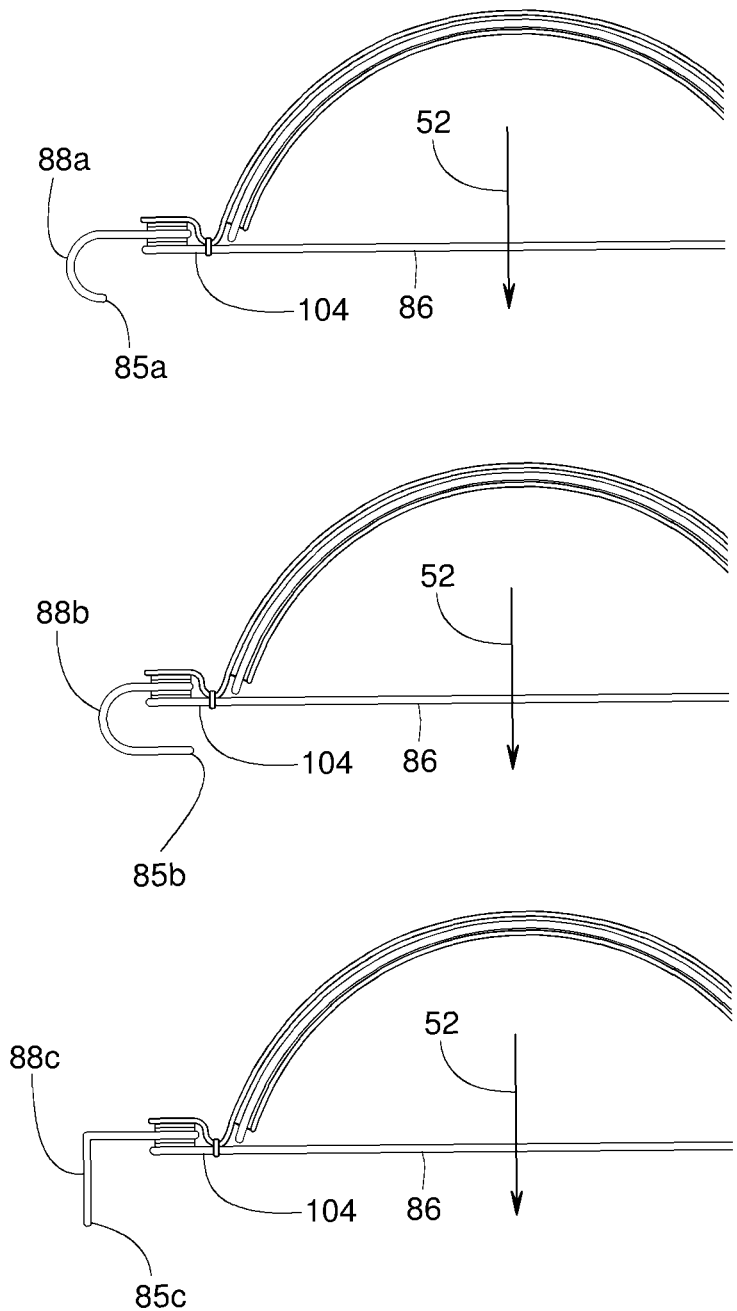
FIG. 16 is a partial cross-sectional top view showing various example lip shapes constructed in accordance with the teachings disclosed herein.

In the example shown in FIGS. 7 and 8, the lateral seal 60 includes a front sheet 86, a lip 88 (e.g., a lip 88a, a lip 88b, and a lip 88c, as shown in FIG. 16), a back sheet 90, and at least one curved stay 92. The front sheet 86, the back sheet 90 and the lip 88 are vertically elongate, and the stay 92 is horizontally elongate. Some examples of the front sheet 86 are made of a relatively thick sheet material that is tough and pliable to withstand vehicular impact and/or abrasion yet is sufficiently flexible to sealingly conform to the vehicle 18. More specifically, in some examples, the front sheet 86 has a front sheet material thickness 94 that is greater than a back sheet material thickness 96 of the back sheet 90 and greater than the covering material thickness 82. In some examples, the front sheet 86 is a coated vinyl based DURATHON sheet, where DURATHON is a registered trademark of Rite-Hite Holding Corporation, of Milwaukee, Wis. In some examples, the front sheet 86 is a 40-ounce DURATHON sheet, where "40-ounce" refers to a sheet of material having a sheet material thickness 94 that provides the front sheet 86 with a weight of about 40 ounces per square-yard.

FIG. 1 shows the lateral seal 60 having a plurality of stays 92 vertically distributed along the vertical length of the lateral seal 60. In some examples, an equal plurality of strips 98 are sewn or otherwise attached to the back sheet 90 such that the back sheet 90 provides a plurality of sheaths 100 to contain or receive the stays 90, thereby holding stays 90 in place or position. Prior to the stay 90 being inserted into the sheath 100, the stay 92 is generally straight and in a relaxed, unrestrained state.

The stay 92 is resiliently flexible and when installed or positioned within the sheath 100, with an inner end 102 of the stay 92 being proximate a distal end 104 of the front sheet 86 and an outer end 106 of the stay 18 being proximate a proximal end 108 of the front sheet 86, the stay 92 becomes bowed or curved (e.g., is formed or configured to have a curved profile that is under stress). When the stay 92 is curved in the sheath 100, the stress places a front surface 110 of the stay 92 in compression and a back surface 112 of the stay 92 in tension. The stressed condition of the stay 92 when curved subjects the front sheet 86 to tension in a horizontal direction between the front sheet's proximal end 108 and distal end 104. Thus the stay 92 in the curved condition holds the front sheet 86 taut and substantially flat when the lateral seal 60 is in the resting configuration. The stay 92 is made of a stay material, examples of which include, but are not limited to, fiberglass, other plastics, and/or spring steel. Some examples of the stay 92 have a width 114 of about 1.25 inches and a stay material thickness 116 or diameter of about 0.03 to 0.13 inches.

Other assembly features of the illustrated example of the lateral seal 60 include a fabric strip 118 and fasteners 120 to connect the lateral seal 60 to side support member 62. In some examples, one or more additional fasteners 120 may connector couple the lip 88 to the front sheet 86, to the back sheet 90, and/or to the inner end 102 of the stay 92. In some examples, a sewn seam 122 or other comparable fastening means may connector couple the back sheet 90 and the front sheet 86 and/or to connect strips 98 to the back sheet 90. In some examples, fasteners 120 may be a hook-and-loop fastener such as VELCRO, which is a registered trademark of Velcro Industries of Curacao. The fastener 120 when implemented by a hook-and-loop fastener provides a conveniently removable connection between the lateral seal 60 and the side support member 62. The fastener 120 when implemented by a hook-and-loop fastener also provides a removable connection between the lip 88' and the front sheet 86. A removable connection makes it easier for a manufacturer to ship side structure assembly 14 in a more compact disassembled state and later makes it easier for a customer to readily replace the lip 88 and/or the lateral seal 60 if the lip 88 and/or the lateral seal 60 become a worn or otherwise damaged.

Figure 9:
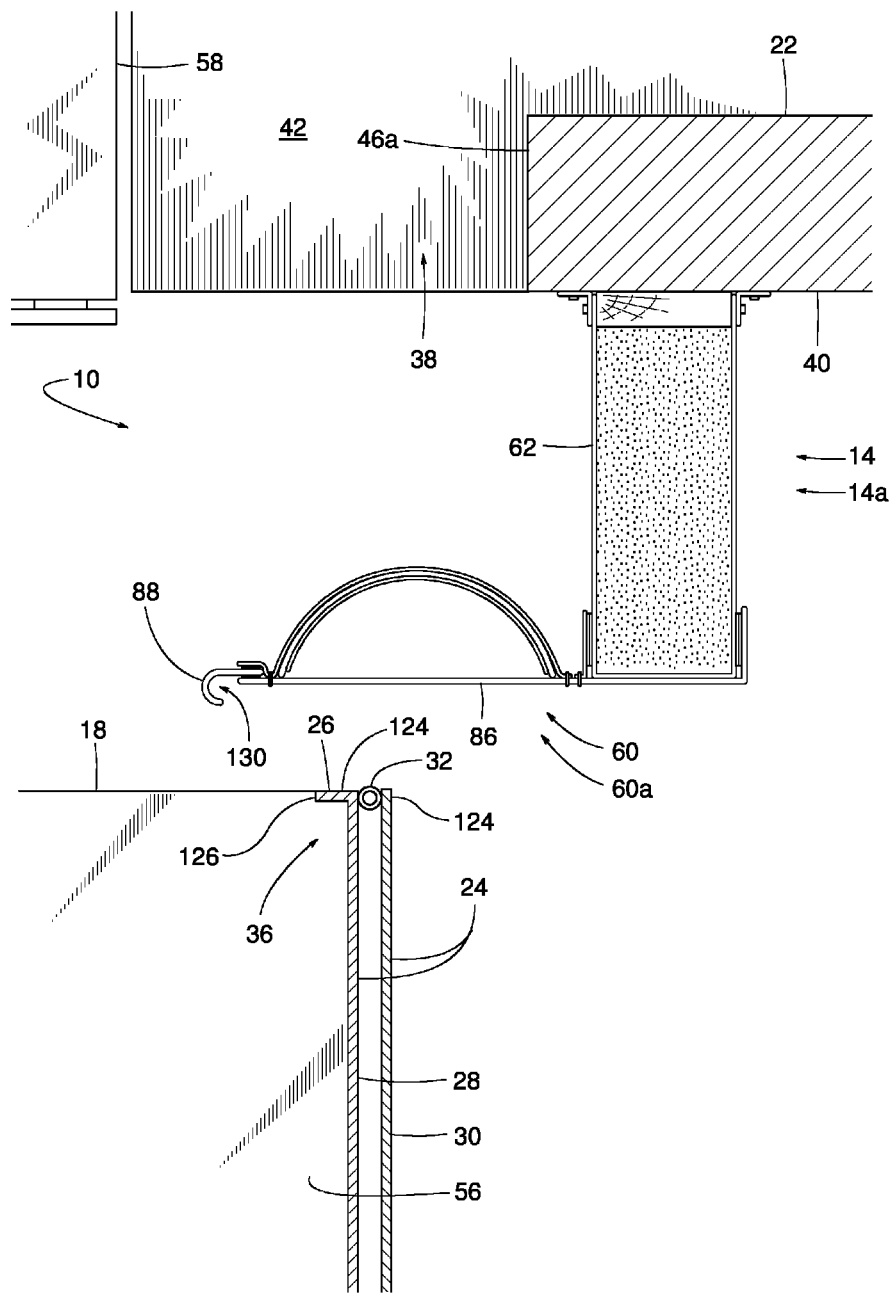
FIG. 9 is a cross-sectional view similar to FIG. 7 but also showing the vehicle approaching the example weather barrier and a doorway of a loading dock.

In operation, as the vehicle 18 backs into the dock 20 from the vehicle's position shown in FIGS. 1, 3 and 9 to the position shown in FIGS. 2, 4 and 10. The vehicle 18 resiliently bends the lateral seal 60 backwards and laterally outward while the front sheet 86 sealingly conforms to a rear portion 124 of the vehicle 18. To ensure a positive seal, the lip 88 hooks onto a rear inner edge 126 of the vehicle 18. The rear inner edge 126 is along the vertical edge of the vehicle's rear cargo opening 34. With the lip 88 hooked onto the vehicle's rear inner edge 126, the front sheet 86 becomes pulled tightly across a hinge gap 128, as shown for example in FIGS. 4 and 10.

To ensure that the lip 88 effectively hooks onto or engages the vehicle's rear inner edge 126 without slipping off, some examples of the lip 88 define a vertically elongate channel 130 into which the vehicle's rear edge 126 fits or is positioned. Although various lip shapes can provide a vertically elongate channel, some illustrated examples show the lip 88 (e.g., the lip 88a) having a generally J-shaped horizontal cross-section. Other example cross-sectional shapes of the lip 88 include, but are not limited to, L-shaped and C-shaped, as shown in FIG. 16. Regardless of whether the lip 88 has a J-shape, L-shape, C-shape, or some other shape, the lip 88 has a distal lip edge 85a, 85b or 85c that is farther forward than the distal end 4 of the front sheet 86 when the vehicle 18 is spaced apart from the lip 88, where the distal lip edge 85a, 85b and 85c help ensure that the lip 88 effectively hooks onto the vehicle's rear inner edge 126.

To further prevent the lip 88 from accidentally slipping off of the vehicle's rear edge 126, some examples of the lip 88 are relatively rigid (e.g., stiffer than a sheet material of the front sheet 86, the back sheet 90, and/or the covering 80). In some examples, such relative rigidity is provided by the lip 88 having a lip material thickness 132 that is greater than the front sheet material thickness 94, the back sheet material thickness 96, the covering material thickness 82, and/or the stay material thickness 116. In some examples, the lip material thickness 132 is about 0.13 inches thick.

The lip 88 catching or being in engagement with the vehicle's rear inner edge 126 and the front sheet 86 sealing or being in sealing engagement with the hinge gap 128 prevents an otherwise adverse current of air flow through the gap 128 between the indoor and outdoor areas of the building 22. To accommodate variations in vehicle size and vehicle misalignment with (e.g., a midpoint of) the doorway 38, the side structure assembly 14 is configured to flex or bend. In some examples, the flexure of the side structure assembly 14 is by virtue of a combination of the side support member 62 being resiliently flexible, the resilient flexibility of the stay 92, the flexibility of the front sheet 86, the flexibility of back sheet 90, and/or an air gap 134 between the stay 92 and the front sheet 86 (and/or the air gap 134 between the sheets 86 and 90). To enable the stay 92 to subject the front sheet 86 to an effective spring force that keeps or maintains the front sheet 86 in a taut condition (e.g., in tension), some examples of the stay 92 include a stay material (e.g., fiberglass or spring steel) that is stiffer than the sheet material (e.g., vinyl based material) of the front sheet 86 and the back sheet 90. In some examples, the back sheet 90 is relatively thin so as to hinder neither the movement of the front sheet 86 nor the spring action of the stay 92 (e.g., enables the stay 92 to move to the curved condition). In some examples, the back sheet 90 is a vinyl based material sometimes referred to as 22-ounce vinyl, wherein "22-ounce" refers to a sheet of material having a back sheet material thickness 96 that provides back sheet 90 with a weight of about 22 ounces per square-yard.

FIGS. 4 and 10 show the lateral seal 60 in a centered position in response to the vehicle 18 parking at a centrally aligned position. FIGS. 5 and 11 show the lateral seal 60a shifted to an outward offset position in response to the vehicle 18 parking at a first laterally offset position (e.g., off center relative to a midpoint of the doorway 38 with reference to the lateral direction 54). FIGS. 6 and 12 show lateral seal 60a shifted to an inward offset position in response to the vehicle 18 parking at a second laterally offset position (e.g., off center relative to a midpoint of the doorway 38 with reference to the lateral direction 54) that is different than the first laterally offset position.

In each of the examples illustrated of FIGS. 4-6 and 10-12, the rear portion 124 of the vehicle 18 is shown at a given distance 136 adjacent (e.g., in front of) the plane 50 or the wall. In some examples, a vehicle restraint or bumpers may be positioned on a front face of the wall 40 help establish given distance 136, and/or a driver simply stops the vehicle 18 at given distance 136.

With vehicle 18 at given distance 136 and due to a combination of side support member 62 being resiliently flexible, the resilient flexibility of curved stay 92, the flexibility of front sheet 86 and the flexibility of back sheet 90. In some examples, the resiliently flexible side support member 62 and the resilient flexibility of the stay 92, the front sheet 86 and/or the back sheet 90 enables the stay 92 of the side structure assembly 62 to move farther away from the plane 50 when the lateral seal 60a is at the inward offset position (FIG. 12) than when the lateral seal 60a is at the centered position (FIG. 10). Conversely, with the vehicle 18 at given distance 136, the stay 92 is positioned farther away from the plane 50 when the lateral seal 60a is at the outward offset position (FIG. 11) than when the lateral seal 60a is at the centered position (FIG. 10). Specifically, a distance 138 (FIG. 12) from the stay 92 to the plane 50 is slightly greater than a distance 140 (FIG. 10) from the stay 92 to the plane 50, and a distance 142 (FIG. 11) from the stay 92 to the plane 50 is slightly less than distance 140 of FIG. 10. The variation in distance from the stay 92 to the plane 50 while the vehicle 18 is at given distance 136 is a result of the stay 92 bending or flexing in a shape to ensure the lip 88 remains hooked onto the vehicle's rear edge 126 and the front sheet 86 remains in sealing contact or engagement with the vehicle 18. In other words, the stay 92 has a first radius of curvature when the vehicle 18 is not in engagement with the side structure assembly 62 and a second radius of curvature different than the first radius of curvature when the vehicle is in engagement with the side structure assembly 62.

FIGS. 13-15 show the example side structure assembly 10', where FIGS. 13, 14 and 15 correspond to FIGS. 7, 9 and 10, respectively. The side structure assembly 10' of the illustrated example includes a lateral seal 60' with a stay 92' that is longer in length than the stay 92 of the lateral seal 60. The stays 92 and 92' are otherwise similar in structure. In the illustrated example, the stay 92' extends through a slit 144 in the back sheet 90 and through a slit 146 in the strip 118 so that outer end 106' of the stay 92' extends in front of the projected end 74 of the side support member 62. In some examples, the outer end 106' of the stay 92' is sandwiched or positioned between the front sheet 86 and the projected end 74 of the side support member 62. In some examples, the side structure assembly 14' has a plurality of vertically spaced apart stays 92', and each of the slits 144 and 146 is one of a corresponding plurality of vertically spaced apart slits distributed over substantially the full height of side structure assembly 14'. This arrangement improves the side support member's ability to support lateral seal 60' in a cantilevered manner.

The side structure assembly 14' refers to either the first side structure assembly 14a or the second side structure assembly 14b. The side structure assembly 14' includes the side support member 62, the front sheet 86, the back sheet 90, the stay 92' (e.g., bowed or curved stay), the lip 88 (e.g., with the channel 130), and the lateral seal 60', respectively, corresponds to the first side structure assembly 14a including a first side support member 62a, a first front sheet 86, a first back sheet 90, a first stay 92', a first lip 88 (with a first channel 130), and a first lateral seal 60a. Likewise, the side structure assembly 14' includes the side support member 62, the front sheet 86, the back sheet 90, the stay 92', the lip 88 (e.g., with the channel 130), and the lateral seal 60', also corresponds to the second side structure assembly 14b including a second side support member 62b, a second front sheet 86, a second back sheet 90, a second stay 92', a second lip 88 (e.g., with a second channel 130), and a second lateral seal 60b, respectively.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A weather barrier for at least partially sealing or sheltering a vehicle parked at a loading dock of a building, wherein the building has a wall facing in a forward direction toward the vehicle when the vehicle is parked at the loading dock, the wall defining a doorway proximate a rear portion of the vehicle when the vehicle is parked at the loading dock, the doorway having a lateral doorway edge that is vertically elongate, the weather barrier comprising:
a side support member being vertically elongate between an upper end and a lower end of the side support member, the side support member having a back end to attach to the wall proximate the lateral doorway edge, the side support member extending in the forward direction to a front end of the side support member;
a front sheet being vertically elongate, the front sheet including a pliable sheet, the front sheet having a proximal end and a distal end, the proximal end to attach to the front end of the side support member, the front sheet extending in a lateral direction from the proximal end to the distal end, the lateral direction being horizontal and perpendicular to the forward direction, the front sheet extending in front of the doorway; and
a stay to couple to the front sheet, the stay being resiliently flexible and horizontally elongate, the stay to be positioned closer to the loading dock of the building than the front sheet when the stay is coupled to the front sheet, the stay having a bowed profile when coupled to the front sheet and a vehicle is not engaged with the weather barrier to subject the front sheet to tension in a horizontal direction.

2. The weather barrier of claim 1, wherein the front sheet is to be substantially flat and taut when the stay subjects the front sheet to tension in the horizontal direction.

3. The weather barrier of claim 1, wherein the stay and the front sheet define an air gap between the stay and the front sheet.

4. The weather barrier of claim 1, further comprising a lip attached to the distal end of the front sheet, the lip being vertically elongate, the lip being comprised of a lip material that is stiffer than the pliable sheet, the lip having a distal lip edge that is farther forward than the distal end of the front sheet when the vehicle is spaced apart from the lip.

5. The weather barrier of claim 4, wherein the lip defines a channel that is vertically elongate, and the lip has a generally J-shaped cross-sectional area.

6. The weather barrier of claim 4, wherein the lip has a generally L-shaped cross-sectional area.

7. The weather barrier of claim 4, wherein the lip has a generally C-shaped cross-sectional area.

8. The weather barrier of claim 1, further comprising a back sheet to provide a sheath to contain the stay.

9. The weather barrier of claim 1, further comprising a back sheet to provide a sheath to contain the stay, the front sheet and the back sheet define an air gap between the front sheet and the back sheet.

10. The weather barrier of claim 1, further comprising a back sheet to provide a sheath to contain the stay, the front sheet and the back sheet define an air gap between the front sheet and the back sheet, and the back sheet is vertically elongate while the stay is horizontally elongate.

11. A weather barrier for at least partially sealing or sheltering a vehicle parked at a loading dock of a building, the building having a wall facing in a forward direction toward the vehicle when the vehicle is parked at the loading dock, the vehicle to be parked at the loading dock selectively in at least one of a centrally aligned position, a first laterally offset position, and a second laterally offset position, the wall defining a doorway proximate a rear portion of the vehicle when the vehicle is parked at the loading dock, the vehicle and the doorway being centrally aligned with reference to a lateral direction when the vehicle is parked at the centrally aligned position, the vehicle being laterally misaligned with the doorway when the vehicle is at either the first laterally offset position or the second laterally offset position, the lateral direction being horizontal and perpendicular to the forward direction, the vehicle having a side panel, the vehicle having a door panel hinged to the side panel at the rear portion of the vehicle, the door panel and the side panel defining therebetween a hinge gap that is vertically elongate along the rear portion of the vehicle when the door panel is open, the weather barrier comprising:
a side support member being vertically elongate between an upper end and a lower end of the side support member, the side support member having a back end attached to the wall, the side support member extending in the forward direction to a front end of the side support member; and
a lateral seal including:
a front sheet being vertically elongate, the front sheet being a sheet material that is pliable, the front sheet having a proximal end and a distal end, the proximal end being attached to the front end of the side support member, the front sheet extending in the lateral direction from the proximal end to the distal end;

a curved stay being horizontally elongate, the curved stay extending horizontally between an outer end of the curved stay and an inner end of the curved stay, the inner end of the curved stay being attached to the distal end of the front sheet, the outer end of the curved stay being attached to the proximal end of the front sheet, the curved stay having a front surface and a back surface, the front surface facing away from the wall, the back surface facing away from the front surface, the curved stay being resiliently flexible, the curved stay to bow to provide the front surface of the curved stay in compression and the back surface of the curved stay in tension, the curved stay to impart a tension force to the front sheet in a horizontal direction, the curved stay being comprised of a stay material that is stiffer than the sheet material, the curved stay to be positioned closer to the loading dock of the building than the front sheet when the curved stay is coupled to the front sheet; and a lip being vertically elongate and attached to the distal end of the front sheet, the lip defining a channel that is vertically elongate, the lip being comprised of a lip material that is stiffer than the sheet material;

the lateral seal being configurable selectively between a resting configuration and a deflected configuration, the lateral seal is to be spaced apart from the vehicle when the lateral seal is in the resting configuration, the lip is closer to the wall when the lateral seal is in the deflected configuration than when the lateral seal is in the resting configuration, the channel of the lip to receive a rear portion of a vehicle when the lateral seal is in the deflected configuration, the front sheet to engage the rear portion of the vehicle when the lateral seal is in the deflected configuration, and the front sheet to be held in tension across the hinge gap when the lateral seal is in the deflected configuration.

12. The weather barrier of claim 11, wherein the lateral seal in the deflected configuration is movable selectively to a centered position, an outward offset position and an inward offset position;

the lateral seal to be positioned at the centered position when the vehicle is at the centrally aligned position;

the lateral seal to be positioned at the outward offset position when the vehicle is at the first laterally offset position, the rear portion of the vehicle being closer to the side support member when the vehicle is at the first laterally offset position than when the vehicle is at the centrally aligned position;

the lateral seal to be positioned at the inward offset position when the vehicle is at the second laterally offset position, the rear portion of the vehicle being farther away from the side support member when the vehicle is at the second laterally offset position than when the vehicle is at the centrally aligned position; and the curved stay to be closer to the wall when the lateral seal is at the outward offset position than when the lateral seal is at the centered position; and the curved stay to be farther away from the wall when the lateral seal is at the inward offset position than when the lateral seal is at the centered position.

13. The weather barrier of claim 11, wherein the back surface of the curved stay is in greater tension when the lateral seal is in the deflected configuration than when the lateral seal is in the resting configuration.

14. The weather barrier of claim 11, wherein the lip has a lip material thickness, the front sheet has a sheet material thickness, and the lip material thickness is greater than the sheet material thickness.

15. The weather barrier of claim 11, wherein the side support member includes a covering overlying a foam core that is resiliently compressible, the covering being pliable, the covering having a covering material thickness, the front sheet having a sheet material thickness, and the sheet material thickness being greater than the covering material thickness.

16. The weather barrier of claim 11, further comprising a back sheet providing a sheath to receive the curved stay, the back sheet being vertically elongate, the back sheet extending between the side support member and the lip.

17. The weather barrier of claim 11, wherein the outer end of the curved stay extends in front of a projected end of the side support member.

18. The weather barrier of claim 11, wherein a horizontal cross-sectional area of the lip is substantially J-shaped.

19. The weather barrier of claim 11, wherein the lip has a lip material thickness that is greater than a stay material thickness of the stay.

20. The weather barrier of claim 11, wherein the lip has a lip material thickness that is greater than a front sheet material thickness of the front sheet.

21. The weather barrier of claim 11, further comprising a back sheet providing a sheath to receive the curved stay, wherein the front sheet has a front sheet material thickness that is greater than a back sheet material thickness of the back sheet.

22. A weather barrier for at least partially sealing or sheltering a vehicle parked at a loading dock of a building, wherein the building has a wall, facing in a forward direction toward the vehicle when the vehicle is parked at the loading dock at a given distance in front of the wall, the wall defining a doorway proximate a rear portion of the vehicle when the vehicle is parked at the loading dock, the doorway having a right doorway edge and a left doorway edge, the vehicle having a side panel, the vehicle having a door panel hinged to the side panel at the rear portion of the vehicle, the door panel and the side panel defining therebetween a hinge gap that is vertically elongate along the rear portion of the vehicle when the door panel is open, the weather barrier comprising:

a first side support member being vertically elongate and to mount to the wall proximate the right doorway edge;

a second side support member being vertically elongate and to mount to the wall proximate the left doorway edge;

a first front sheet to attach to the first side support and extend toward the second side support member;

a second front sheet to attach to the second side support and extend toward the first side support member;

a first sheath coupled to the first front sheet;

a first stay to couple to the first front sheet via the first sheath, the first stay being horizontally elongate, the first sheath to cause the first stay to curve when the first stay is coupled to the first sheath such that the first stay, when curved, is to subject the first front sheet to tension in a horizontal direction, the first stay to be positioned closer to the loading dock of the building than the first front sheet when the first stay is coupled to the first front sheet;

a second sheath coupled to the second front sheet;

a second stay to couple to the second front sheet via the second sheath, the second stay being horizontally elongate, the second sheath to cause the second stay to curve when the second stay is coupled to the second sheath such that the second stay, when curved, is to subject the second front sheet to tension in the horizontal direction, the second stay to be positioned closer to the loading dock of the building than the second front sheet when the second stay is coupled to the second front sheet;

a first lateral seal including the first front sheet and the first stay; and a second lateral seal including the second front sheet and the second stay, wherein the first lateral seal and the second lateral seal is to be configurable selectively between a resting configuration and a deflected configuration, the first lateral seal and the second lateral seal to be spaced apart from the vehicle when the first lateral seal and the second lateral seal are in the resting configuration, the first lateral seal and the second lateral seal to bend toward the wall when the first lateral seal and the second lateral seal are in the deflected configuration;

the first lateral seal and the second lateral seal in the deflected configuration being movable selectively between a centered position and a laterally offset position while the vehicle is parked at the loading dock, the vehicle is to be closer to the first side support member when the first lateral seal and the second lateral seal are in the laterally offset position than when the first lateral seal and the second lateral seal are in the centered position;

the first stay is to be closer to the wall when the first lateral seal and the second lateral seal are in the laterally offset position than when the first lateral seal and the second lateral seal are in the centered position; and the second stay is to be farther away from the wall when the first lateral seal and the second lateral seal are in the laterally offset position than when the first lateral seal and the second lateral seal are in the centered position.

23. The weather barrier of claim 22, wherein each of the first front sheet and the second front sheet include a pliable sheet material, and the weather barrier further comprising:

a first lip being vertically elongate and to attach to the first front sheet, the first lip defining a first channel that is vertically elongate, the first channel to receive the rear portion of the vehicle when the vehicle is parked at the loading dock at the given distance from the wall; and a second lip being vertically elongate and to attach to the second front sheet, the second lip defining a second channel that is vertically elongate, the second channel to receive the rear portion of the vehicle when the vehicle is parked at the loading dock at the given distance from the wall, each of the first lip and the second lip including a lip material that is stiffer than the sheet material of the first front sheet and the second front sheet.

24. The weather barrier of claim 22, wherein each of the first front sheet and the second front sheet include a sheet material that is pliable, and each of the first stay and the second stay include a stay material that is stiffer than the sheet material.

25. The weather barrier of claim 22, wherein the first front sheet is held in tension across the hinge gap when the first lateral seal and the second lateral seal are in the deflected configuration.

26. The weather barrier of claim 22, wherein each of the first front sheet and the second front sheet include a front sheet material that is pliable, the front sheet material having a front sheet material thickness, and the weather barrier further comprising:

a first back sheet providing a first sheath to receive the first stay, the first back sheet being vertically elongate; and a second back sheet providing a second sheath to receive the second stay, the second back sheet being vertically elongate, each of the first back sheet and the second back sheet including a back sheet material having a back sheet material thickness that is less than the front sheet material thickness.

27. The weather barrier of claim 22, wherein the first stay extends in front of the first side support, and the second stay extends in front of the second side support.

28. The weather barrier of claim 1, wherein the stay is to pass through at least a portion of the front sheet, the stay having a bowed profile when the stay is coupled to the front sheet.

29. A weather barrier including:

a lateral seal to be coupled to a side support structure, the lateral seal including:

a front sheet having a proximal end and a distal end, the proximal end to attach to the side support structure when the lateral seal is coupled to the side support structure, the front sheet to be directly engaged by a vehicle at loading dock;

a sheath coupled to the front sheet; and a stay coupled to the front sheet via the sheath, the stay and the sheath having a curved profile between a first end of the stay and a second end of the stay when the stay is coupled to the sheath, the stay configured to be positioned between the front sheet and the side support structure when a vehicle engages the front sheet.

30. The weather barrier of claim 29, wherein the stay to subject the front sheet to tension in a horizontal direction.

31. The weather barrier of claim 29, wherein the sheath includes a plurality of sheaths and the stay includes a plurality of stays, the sheaths being vertically distributed along a vertical length of the lateral seal, a respective one of the sheaths to contain a respective one of the stays, each of the stays having a curved profile to subject the front sheet to tension in a horizontal direction.

* * * * *